US012658487B2

(12) United States Patent
Tsuge et al.

(10) Patent No.: US 12,658,487 B2
(45) Date of Patent: *Jun. 16, 2026

(54) RECOVERY PROCESSING METHOD OF LITHIUM ION BATTERY, CHARGE/DISCHARGE DEVICE, AND STORAGE MEDIUM

(71) Applicant: HONDA MOTOR CO., LTD., Tokyo (JP)

(72) Inventors: Hodaka Tsuge, Wako (JP); Shunsuke Konishi, Wako (JP); Seiichi Koketsu, Wako (JP); Hidetoshi Utsumi, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 819 days.

This patent is subject to a terminal disclaimer.

(21) Appl. No.: 17/971,678

(22) Filed: Oct. 24, 2022

(65) Prior Publication Data

US 2023/0207903 A1 Jun. 29, 2023

(30) Foreign Application Priority Data

Dec. 28, 2021 (JP) ................................. 2021-214859

(51) Int. Cl.
H01M 10/44 (2006.01)
H01M 10/0525 (2010.01)
(52) U.S. Cl.
CPC ....... H01M 10/44 (2013.01); H01M 10/0525 (2013.01)

(58) Field of Classification Search
CPC .. H02J 7/007184; H02J 7/0069; H02J 7/0048; H02J 7/00; Y02W 30/84;
(Continued)

(56) References Cited

U.S. PATENT DOCUMENTS 5,432,426 A * 7/1995 Yoshida ............ H02J 7/007184
320/160
9,429,626 B2 * 8/2016 Shiraishi ............ G01R 31/3835
(Continued)

FOREIGN PATENT DOCUMENTS

CN 106443471 2/2017
CN 109901076 A * 6/2019
(Continued)

OTHER PUBLICATIONS

Japanese Office Action for Japanese Patent Application No. 2021-214859 mailed Aug. 20, 2024.
(Continued)

*Primary Examiner* — Jared Fureman
(74) *Attorney, Agent, or Firm* — Amin, Turocy & Watson, LLP

(57) ABSTRACT

A recovery processing method of a lithium ion battery includes repeating a cycle a plurality of times, and the cycle includes a first process of setting an SOC of the lithium ion battery to a first value that is equal to or less than a value of the SOC where a gradient of an SOC-voltage curve is a minimum value through charging, and a second process of setting the SOC of the lithium ion battery to a second value smaller than the first value through discharging.

6 Claims, 6 Drawing Sheets

(58) Field of Classification Search
CPC ... Y02E 60/10; H01M 10/4242; H01M 10/44;
H01M 10/0525; H01M 10/54; H01M
10/42; H01M 10/48; H01M 10/4207
USPC .......................................................... 320/130
See application file for complete search history.

(56) References Cited

U.S. PATENT DOCUMENTS

| | | | | |
|---|---|---|---|---|
| 10,491,011 B2 * | 11/2019 | Uchida | ................. | G01R 31/392 |
| 10,790,552 B2 * | 9/2020 | Isomura | ............ | H01M 10/4242 |
| 10,923,774 B2 * | 2/2021 | Kusano | ............ | H01M 10/4285 |
| 11,251,627 B2 * | 2/2022 | Fukaya | ................... | B60L 58/16 |
| 11,710,863 B2 * | 7/2023 | Hirowatari | ........... | H01M 4/382 |
| | | | | 320/134 |
| 11,721,840 B2 * | 8/2023 | Yoshioka | .............. | H01M 10/48 |
| | | | | 429/188 |
| 11,817,739 B1 * | 11/2023 | Lazarov | ............ | H02J 7/007194 |
| 12,126,203 B2 * | 10/2024 | Miyaki | ................... | H02J 7/007 |
| 2011/0012604 A1 * | 1/2011 | Tsujiko | ............... | H01M 4/5825 |
| | | | | 324/427 |
| 2014/0149058 A1 | 5/2014 | Moh | | |
| 2014/0232410 A1 | 8/2014 | Hayashi et al. | | |
| 2016/0146898 A1 | 5/2016 | Lennevi et al. | | |
| 2016/0193939 A1 | 7/2016 | Smidebrant et al. | | |
| 2018/0067168 A1 * | 3/2018 | Mitsuhashi | .......... | G01R 31/388 |
| 2018/0261889 A1 * | 9/2018 | Kusano | ................. | H01M 10/44 |
| 2024/0347787 A1 * | 10/2024 | Mehta | ................. | H01M 10/052 |

FOREIGN PATENT DOCUMENTS

| | | | | |
|---|---|---|---|---|
| JP | 2000-277164 | | 10/2000 | |
| JP | 2009-252381 | | 10/2009 | |
| JP | 2014-127283 | | 7/2014 | |
| JP | 2016-530863 | | 9/2016 | |
| JP | 2016-531278 | | 10/2016 | |
| JP | 2017091923 A | * | 5/2017 | |
| JP | 2018-156744 | | 10/2018 | |
| JP | 2018156744 A | * | 10/2018 | |
| JP | 6627675 B2 | * | 1/2020 | |
| JP | 2021-082531 | | 5/2021 | |
| JP | 2021-103646 | | 7/2021 | |
| JP | 2022-142030 | | 9/2022 | |
| WO | WO-2021224990 A1 | * | 11/2021 | ........... H01M 10/48 |

OTHER PUBLICATIONS

Japanese Office Action for Japanese Patent Application No. 2021-214861 mailed Sep. 10, 2024.
Japanese Notice of Allowance for Japanese Patent Application No. 2021-214861 mailed Dec. 24, 2024.
Chinese Office Action for Chinese Patent Application No. 202211290658.1 mailed Dec. 18, 2025.

* cited by examiner

RECOVERY PROCESSING METHOD OF LITHIUM ION BATTERY, CHARGE/DISCHARGE DEVICE, AND STORAGE MEDIUM

CROSS-REFERENCE TO RELATED APPLICATION

Priority is claimed on Japanese Patent Application No. 2021-214859, filed Dec. 28, 2021, the content of which is incorporated herein by reference.

BACKGROUND OF THE INVENTION

Field of the Invention

The present invention relates to a recovery processing method of a lithium ion battery, a charge/discharge device and a storage medium.

Description of Related Art

In recent years, for the purpose of $CO_2$ reduction from the viewpoint of climate-related disasters, the interest in electric automobiles has increased, and use of lithium ion batteries for in-vehicle use is being considered.

Lithium ion batteries may experience a drop in performance due to repeated charge/discharge cycles. As a method of recovering the performance of a lithium ion battery, a method of placing the lithium ion battery under predetermined conditions has been proposed (for example, see Japanese Unexamined Patent Application, First Publication No. 2000-277164 and Japanese Unexamined Patent Application, First Publication No. 2021-103646).

SUMMARY OF THE INVENTION

The above-mentioned technologies have not been sufficiently effective in recovering the performance of the lithium ion batteries.

One of objects of the present invention is directed to providing a recovery processing method of a lithium ion battery, a charge/discharge device and a storage medium storing a program, which are excellent with regard to an effect of recovering performance of lithium ion batteries.

A recovery processing method of a lithium ion battery, a charge/discharge device and a storage medium according to the present invention employ the following configurations.

(1) A recovery processing method of a lithium ion battery according to an aspect of the present invention includes repeating a cycle a plurality of times, the cycle including: a first process of setting an SOC of the lithium ion battery to a first value that is equal to or less than a value of the SOC where a gradient of an SOC-voltage curve is a minimum value through charging; and a second process of setting the SOC of the lithium ion battery to a second value smaller than the first value through discharging.

(2) In the aspect of the above-mentioned (1), the first value is greater than 0%, and the gradient of the SOC-voltage curve is equal to or less than the value of the SOC that is two times the minimum value.

(3) In the aspect of the above-mentioned (1) or (2), the first value is 15% or less.

(4) In the aspect of any one of the above-mentioned (1) to (3), prior to the first process and the second process, whether or not there has been a decrease in performance of the lithium ion battery is determined, and the first process and the second process are performed only when a decrease in performance is confirmed.

(5) A charge/discharge device according to an aspect of the present invention is electrically connected to a lithium ion battery, the device including: a controller configured to perform charging/discharging of the lithium ion battery, the controller repeating a cycle a plurality of times, and the cycle including a first process of setting an SOC of the lithium ion battery to a first value that is equal to or less than a value of the SOC where a gradient of an SOC-voltage curve is a minimum value through the charging; and a second process of setting the SOC of the lithium ion battery to a second value smaller than the first value through the discharging.

(6) A non-transitory computer readable storage medium according to an aspect of the present invention is configured to cause a charge/discharge device electrically connected to a lithium ion battery to repeat a cycle a plurality of times, and the cycle includes a first process of setting an SOC of the lithium ion battery to a first value that is equal to or less than a value of the SOC where a gradient of an SOC-voltage curve is a minimum value through charging; and a second process of setting the SOC of the lithium ion battery to a second value smaller than the first value through discharging.

According to the aspects of the above-mentioned (1) to (6), it is possible to provide a recovery processing method of a lithium ion battery, a charge/discharge device and a storage medium storing a program, which are highly effective in recovering performance of a lithium ion battery.

DETAILED DESCRIPTION OF THE INVENTION

Hereinafter, embodiments of a recovery processing method of a lithium ion battery, a charge/discharge device and a storage medium of the present invention will be described with reference to the accompanying drawings.

[Lithium Ion Battery]

Figure 1:
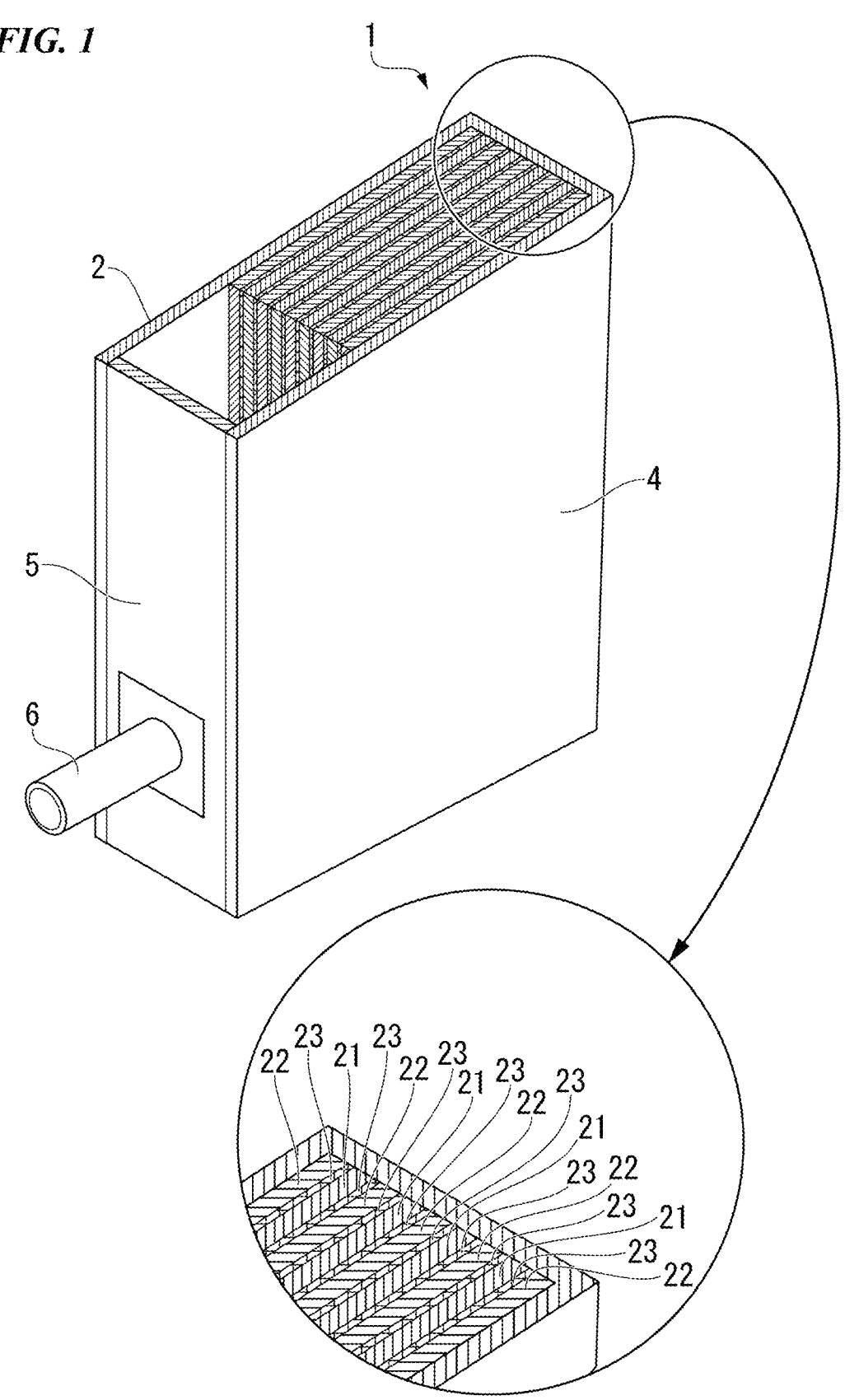
FIG. 1 is a perspective view of an example of a lithium ion battery.

FIG. 1 is a perspective view of an example of a lithium ion battery.

As shown in FIG. 1, a lithium ion battery 1 includes a laminated body 2 including an electrode, an exterior body 4 configured to accommodate the laminated body 2, and a lid body 5 configured to seal the exterior body 4. The exterior body 4 is, for example, a housing formed of a metal. A positive electrode terminal 6 and a negative electrode terminal 7 (see FIG. 2) are provided in the exterior body 4 or the lid body 5.

The laminated body 2 includes a positive electrode 21, a negative electrode 22, and a separator 23. The separator 23 is interposed between the positive electrode 21 and the negative electrode 22. The positive electrode 21, the negative electrode 22 and the separator 23 are impregnated with an electrolytic solution.

The positive electrode 21 has a positive electrode collector and a positive electrode active material layer. The positive electrode active material is, for example, a lithium complex oxide containing nickel, cobalt, and the like. The lithium complex oxide is, for example, a lithium nickel complex oxide, a lithium cobalt complex oxide, a lithium manganese complex oxide, a lithium nickel cobalt complex oxide, a lithium nickel manganese complex oxide, a lithium nickel cobalt manganese complex oxide, or the like.

The negative electrode 22 has a negative electrode collector and a negative electrode active material layer. The negative electrode active material is a carbon material such as graphite or the like.

The separator 23 is formed of a resin such as polyethylene (PE), polypropylene (PP), or the like.

The electrolytic solution contains, for example, a nonaqueous solvent, and a lithium salt (electrolyte). As the nonaqueous solvent, ethylene carbonate (EC), propylene carbonate (PC), and diethyl carbonate (DEC) are exemplified. As the electrolyte, 6-fluorinated phosphate lithium (LiPF6), 4-fluorinated borate lithium (LiBF4), or the like, is exemplified.

The lithium ion battery 1 is mounted on, for example, a vehicle.

[Charge and Discharge Device]

Figure 2:
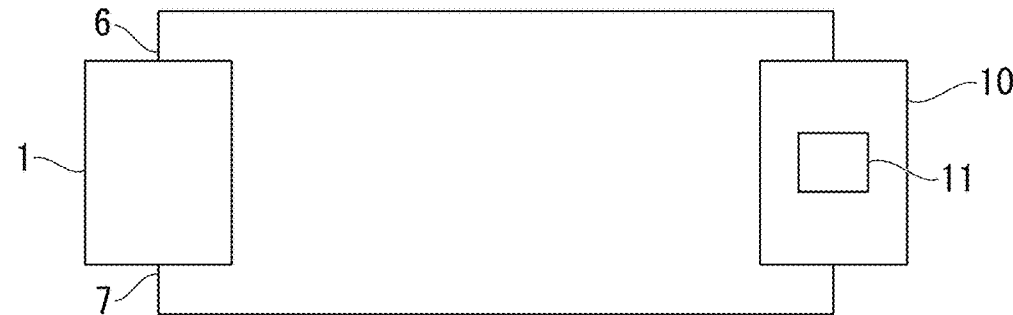
FIG. 2 is a configuration view of a charge/discharge device.

FIG. 2 is a configuration view of a charge/discharge device 10 of the embodiment.

As shown in FIG. 2, the charge/discharge device 10 is electrically connected to the positive electrode terminal 6 and the negative electrode terminal 7 of the lithium ion battery 1. The charge/discharge device 10 includes a controller 11. The controller 11 can perform charge/discharge of the lithium ion battery 1 according to a recovery processing method, which will be described below. The charge/discharge device 10 may include a power supply configured to charge the lithium ion battery 1. When the power supply is not provided, an external power supply is used. The charge/discharge device 10 is mounted on, for example, a vehicle. The charge/discharge device 10 may be mounted on a battery exchanging device.

The controller 11 is realized by executing a program (software) using a hardware processor such as a central processing unit (CPU) or the like. Some or all of the components may be realized by hardware (a circuit part; including circuitry) such as a large scale integration (LSI), an application specific integrated circuit (ASIC), a field-programmable gate array (FPGA), a graphics processing unit (GPU), or the like, or may be realized by cooperation of software and hardware. The program may have been previously stored in a storage device such as an HDD, a flash memory, or the like, of the controller 11 (a storage device including a non-transient storage medium), and may be stored in a detachably storage medium such as a DVD, a CD-ROM, or the like, and installed in the HDD or the flash memory of the controller 11 by mounting the storage medium (non-transient storage medium) in a drive device.

[Decrease in Performance of Lithium Ion Battery Due to Repetition of Charge/Discharge]

In the lithium ion battery, performance such as a discharge capacity is decreased by repeating charge/discharge. A cause of a decrease in performance is lithium (for example, dendrite) or the like precipitated on, for example, a negative electrode surface. The decrease in performance is likely to occur in a low temperature environment (for example, 0° C. or less).

Figure 3:
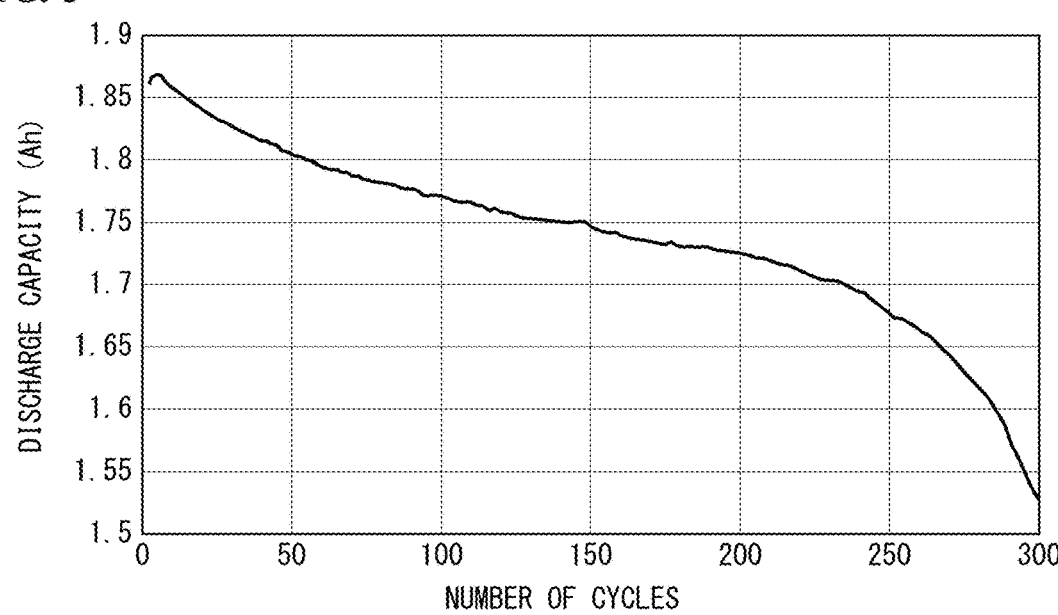
FIG. 3 is a graph showing an example of variation in discharge capacity in a charge/discharge test.

FIG. 3 is a graph showing an example of a variation in discharge capacity in a charge/discharge test.

As shown in FIG. 3, in the lithium ion battery in the example, as a number of cycles (a number of repetitions) of charge/discharge increases a discharge capacity gradually decreases.

Figure 4:
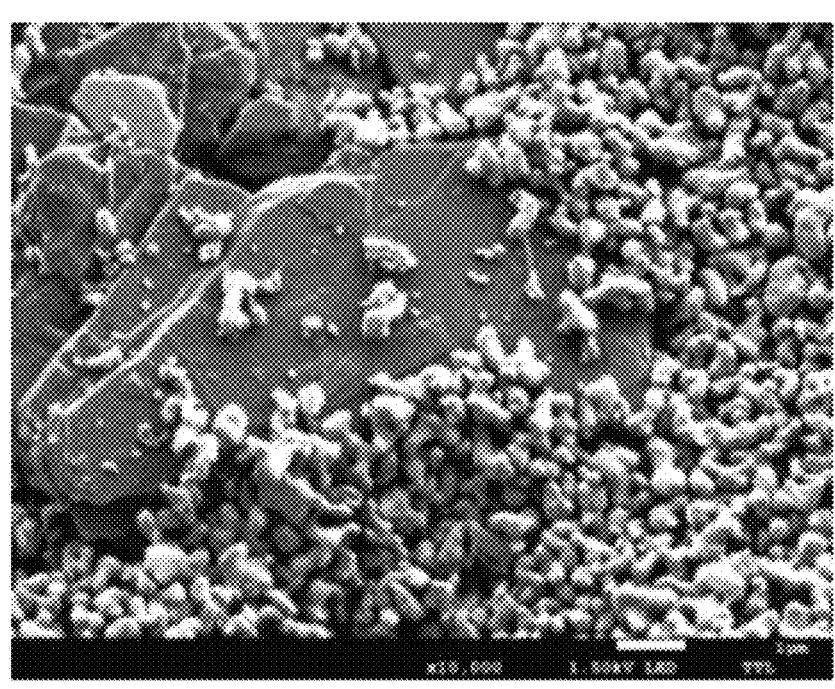
FIG. 4 is a scanning electron microscope (SEM) image of a surface of a negative electrode of the lithium ion battery at the beginning of the charge/discharge test.
Figure 5:
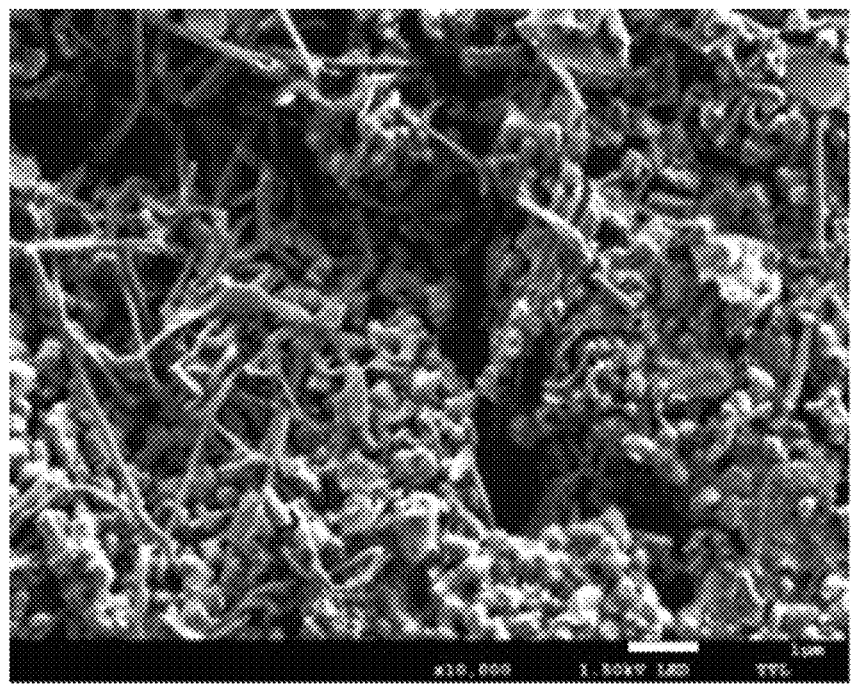
FIG. 5 is a SEM image on the surface of the negative electrode of the lithium ion battery at the end of the charge/discharge test.

FIG. 4 is a scanning electron microscope (SEM) image of a surface of a negative electrode of a lithium ion battery at the beginning of a charge/discharge test. FIG. 5 is a SEM image on the surface of the negative electrode of the lithium ion battery at the end of the charge/discharge test.

As shown in FIG. 4 and FIG. 5, it can be seen that needle crystals (dendrites) of lithium were formed on the surface of the negative electrode by repeating charge/discharge.

[Recovery Processing Method of Lithium Ion Battery]

The lithium ion battery in which the performance has decreased can exhibit performance recovery by the following method. A recovery processing method described below can be performed by the charge/discharge device 10 (see FIG. 2).

Figure 6:
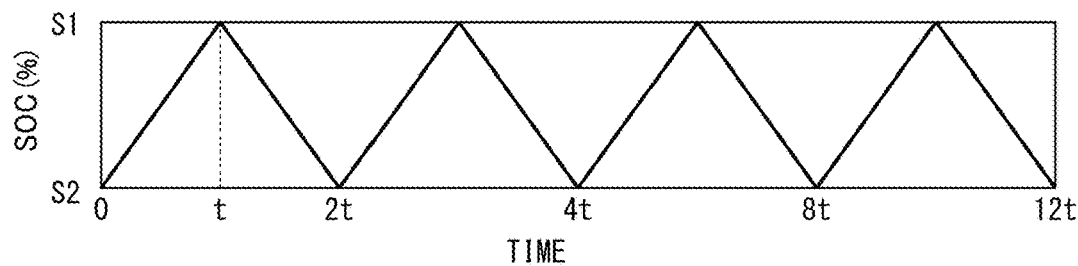
FIG. 6 is a view for describing an example of a recovery processing method of a lithium ion battery of an embodiment.

FIG. 6 is a view for describing an example of the recovery processing method of the embodiment. Further, the recovery processing method of the lithium ion battery is also simply referred to as "a recovery processing method."

As shown in FIG. 6, the recovery processing method of the embodiment repeats a cycle including the following two processes a plurality of times.

A first process: An SOC of the lithium ion battery is brought to an upper limit value S1 by charging. The upper limit value S1 is an example of "a first value."

A second process: An SOC of the lithium ion battery is brought to a lower limit value S2 by discharging. The lower limit value S2 is an example of "a second value."

Prior to the first process, a preparation process of discharging the lithium ion battery to a discharge termination voltage may be performed.

The state of charge (SOC) is a charge rate (%) of the lithium ion battery. In the recovery processing method of the embodiment, since a first process of setting the SOC to the upper limit value S1 and a second process of setting the SOC to the lower limit value S2 are repeated, the SOC is increased and decreased repeatedly. In the recovery processing method of the embodiment, in the first process, the SOC is increased linearly. In the second process, the SOC is decreased linearly.

In the example shown in FIG. 6, while an initial process is the first process, either the first process or the second process may come first.

Figure 7:
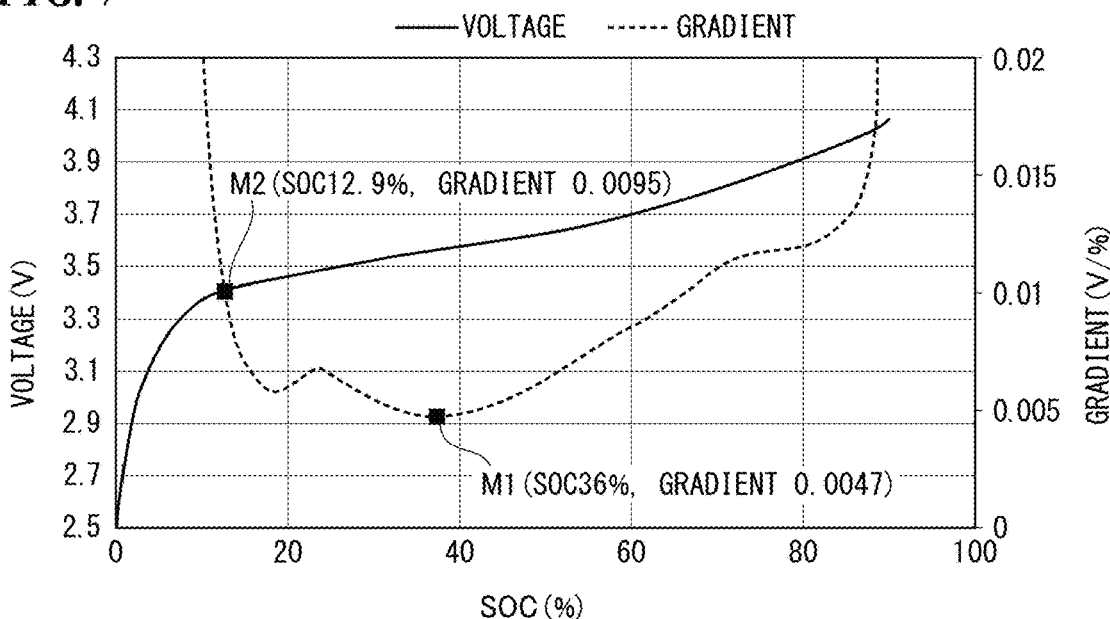
FIG. 7 is an example of an SOC-voltage curve.

FIG. 7 is an example of "an SOC-voltage curve" expressing a relation between the SOC and the voltage. A lateral axis of FIG. 7 shows the SOC (%). A vertical axis of FIG. 7 shows a voltage (V). The SOC-voltage curve can be acquired as follows.

A capacity of the lithium ion battery is obtained, for example, as follows.

A lithium ion battery using lithium complex oxide of a ternary system containing cobalt, nickel and manganese as a positive electrode active material will be exemplified. A rated voltage is a 3.6 V. A capacity is 3 Ah. An upper limit voltage is 4.2 V. A lower limit voltage is 2.5 V.

After the lithium ion battery is placed in a thermostatic oven at 25° C. and is left for four hours, the following operations are performed under a temperature condition of 25° C. in the thermostatic oven.

(1) The lithium ion battery is discharged to 2.5 V at a current of 3 A (corresponding to 1 C at a rated capacity), and left for 10 seconds.

(2) The lithium ion battery is charged to 4.2 V at a constant current of 3 A.

(3) The lithium ion battery is charged at a constant voltage of 4.2 V until the current becomes 0.6 A (corresponding to 0.2 C at the rated capacity).

(4) The lithium ion battery is discharged to 2.5 V at a constant current of 3 A. The capacity upon the discharge is measured.

During the discharge (operation (4)), the voltage is measured at each second.

The SOC is calculated by "(capacity–current·time)/capacity×100(%)."

The SOC-voltage curve shown in FIG. 7 can be created by the obtained SOC and voltage.

An gradient of the SOC-voltage curve is a linear gradient obtained by linearly approximating a range of the SOC from 30 seconds before to 30 seconds after the present time point by using a least square method, regarding the SOC and the voltage. The gradient of the SOC-voltage curve is a proportion (V/%) of a variation amount of a voltage (V) with respect to a variation amount (%) of the SOC.

The upper limit value S1 (see FIG. 6) of the SOC is set to a value of the SOC or less at a point M1 where the gradient of the SOC-voltage curve is a minimum value in FIG. 7. In the example shown in FIG. 7, the gradient of the SOC-voltage curve is a minimum value of 0.0047 at a point M1. The SOC at this time is 36%. For this reason, the upper limit value S1 of the SOC is set to 36% or less. The upper limit value S1 is preferably 15% or less or more preferably 12% or less.

Since the upper limit value S1 of the SOC is set to the value of the SOC or less at the point M1, the amount of the lithium ions occluded by the negative electrode can be reduced, and lithium (for example, dendrite) can be easily decomposed in the negative electrode.

The upper limit value S1 (see FIG. 6) of the SOC is preferable to be equal to or less than a value of the SOC at a point M2 where the gradient of the SOC-voltage curve is two times the minimum value in FIG. 7. The SOC at the point M2 is smaller than the SOC at the point M1. In the example shown in FIG. 7, the gradient of the SOC-voltage curve is value (0.0095) two times the minimum value of 0.0047 at the point M2. The SOC at this time is 12.9%. For this reason, the upper limit value S1 of the SOC is preferably 12.9% or less.

When the upper limit value S1 of the SOC is the value of the SOC or less at the point M2, the lithium (for example, dendrite) in the negative electrode can be easily decomposed.

The upper limit value S1 (see FIG. 6) of the SOC is greater than 0%. The upper limit value S1 may be 0.2% or more (for example, 1.1% or more).

The lower limit value S2 (see FIG. 6) of the SOC is 0% or more and smaller than the upper limit value S1. The lower limit value S2 may be 0%. The lower limit value S2 may be, for example, 0% to 7%.

Figure 8:
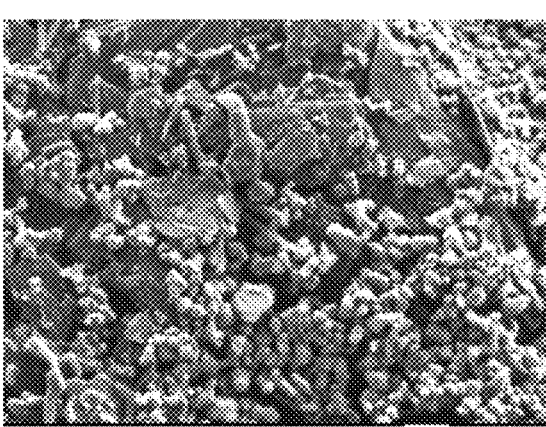
FIG. 8 is a SEM image on the surface of the negative electrode of the lithium ion battery after recovery processing is performed.

FIG. 8 is a SEM image on the surface of the negative electrode of the lithium ion battery after the recovery processing is performed.

As shown in FIG. 8, the lithium (for example, dendrite) on the surface of the negative electrode is smaller than that before the recovery processing (see FIG. 5).

In the recovery processing method of the embodiment, prior to the recovery processing including the first process and the second process, which are described above, only when whether or not there is a decrease in performance of the lithium ion battery is determined and the decrease in performance is confirmed, the recovery processing may be executed. Whether or not there is a decrease in performance can be determined on the basis of, for example, the recovery rate of the capacity. A non-operation period of the lithium ion battery can be shortened by determining whether there is a decrease in performance.

Effect Exhibited by Recovery Processing Method of Embodiment

According to the recovery processing method of the embodiment, a cycle including a first process of setting the SOC to the upper limit value S1 by charging and a second process of setting the SOC to the lower limit value S2 by discharging is repeated a plurality of times. The upper limit value S1 is set to the value of the SOC or less at the point M1 where the gradient of the SOC-voltage curve is the minimum value. Accordingly, the amount of the lithium ion occluded by the negative electrode can be reduced, and the lithium (for example, dendrite) can be easily decomposed in the negative electrode. Accordingly, the performance of the lithium ion battery can be recovered.

Improvement of the energy efficiency can be achieved by lengthening a lifespan of the lithium ion battery due to performance recovery of the lithium ion battery.

Hereinabove, while the aspect performed by the present invention has been described using the embodiment, the present invention is not particularly limited to the embodiment and various modifications and substitutions may be made without departing from the scope of the present invention.

Hereinafter, the present invention will be described in detail on the basis of the specific example. Further, the present invention is not limited to the following example.

Example 1

A lithium ion battery using lithium complex oxide of a ternary system containing cobalt, nickel and manganese as a positive electrode active material was prepared. A rated voltage was 3.6 V. A capacity was 3 Ah. An upper limit voltage was 4.2 V. A lower limit voltage was 2.5 V.

(Fabrication of Sample with Decrease in Performance)

The lithium ion battery was provided for a charge/discharge test described as follows.

After the lithium ion battery was placed in a thermostatic oven at –10° C. and left for 4 hours, the following operations (A) and (B) were repeated by 300 cycles under a temperature condition of –10° C. in the thermostatic oven.

(A) The lithium ion battery is discharged to 2.5 V at a current of 9 A and left for 10 seconds.

(B) The lithium ion battery is charged to 4.2 V at a current of 9 A and left for 10 seconds.

Accordingly, a sample with a decrease in performance (degradation) was obtained.

(Recovery Processing)

As shown in FIG. 6, a cycle including the following two processes was repeated on the above-mentioned sample using the charge/discharge device 10 (see FIG. 2) a plurality of times. A processing time was 72 hours. The SOC-voltage curve is shown in FIG. 7.

A first process: The SOC of the lithium ion battery is set to the upper limit value S1 by charging. The charge time was t. The current upon the charging was 9 A.

A second process: The SOC of the lithium ion battery is set to the lower limit value S2 by discharging. The discharge time was t. The current upon the discharging was 9 A.

An initial capacity, a capacity after decrease in performance (after degradation), and a capacity after recovery of the lithium ion battery were measured by the above-mentioned capacity measurement method.

A recovery rate was calculated by the following equation. The results are shown in Table 1 and FIG. 9.

$$\text{Recovery rate} = (\text{capacity after recovery} - \text{capacity after degradation})/(\text{initial capacity} - \text{capacity after degradation})$$

In Example 1-1 to Example 1-3, t was set to 10 seconds, 100 seconds, and 300 seconds. In Comparative example 1-2, t was set to 730 seconds.

Figure 9:
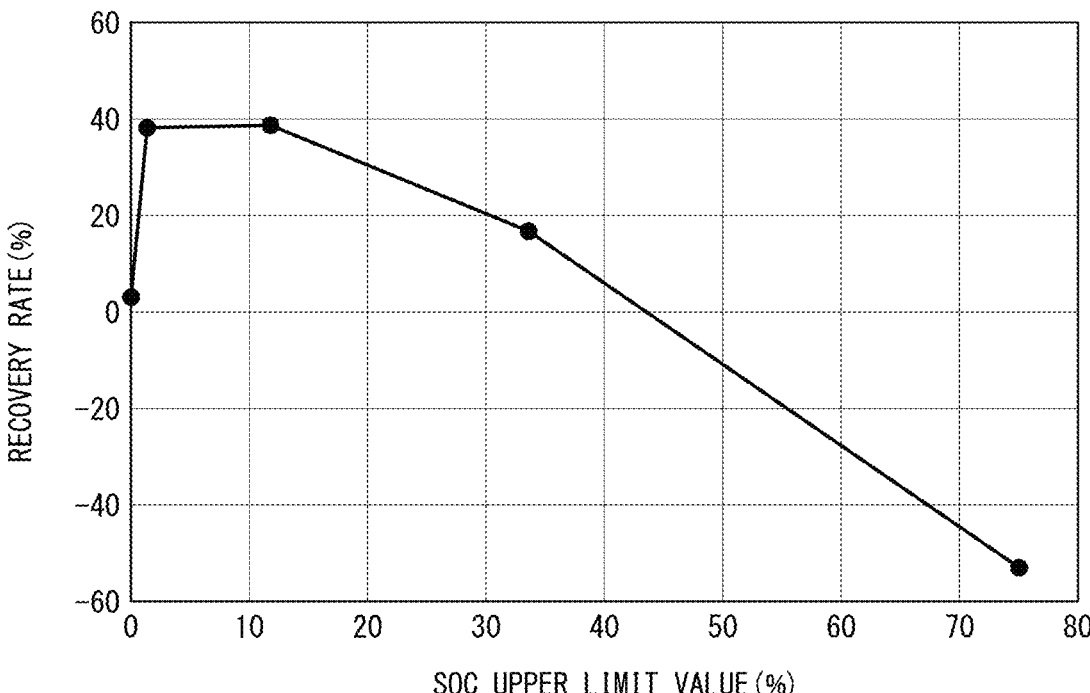
FIG. 9 is a graph showing a test result.

In Table 1 and FIG. 9, for comparison, Comparative example 1-1 without recovery processing is also shown.

TABLE 1

| | Comparative example 1-1 | Example 1-1 | Example 1-2 | Example 1-3 | Comparative example 1-2 |
|---|---|---|---|---|---|
| t (sec) | — | 10 | 100 | 300 | 730 |
| SOC lower limit value (%) | — | 0 | 0 | 0 | 0 |
| SOC upper limit value (%) | — | 1.1 | 11.6 | 33.4 | 75.1 |
| Initial capacity (Ah) | 2.97 | 3.06 | 2.98 | 3.00 | 2.93 |
| Capacity after degradation (Ah) | 2.35 | 2.17 | 2.15 | 2.24 | 2.43 |
| Capacity after recovery (Ah) | 2.37 | 2.51 | 2.47 | 2.37 | 2.17 |
| Recovery rate (%) | 3.23 | 38.00 | 38.55 | 16.84 | −52.67 |

As shown in Table 1 and FIG. 9, in Examples 1-1 to 1-3 in which recovery processing was performed, a high recovery rate was obtained.

On the other hand, in Comparative example 1-1 in which recovery processing was not performed, a recovery rate was low. The recovery rate was low also in Comparative example 1-2 in which the upper limit value of the SOC was set to 75.1%.

Example 2

A recovery processing test was performed in the same manner as Example 1 except for the discharge voltage. The results are shown in Table 2 and FIG. 10. The "discharge voltage" is a voltage upon termination of discharging in the second process.

Figure 10:
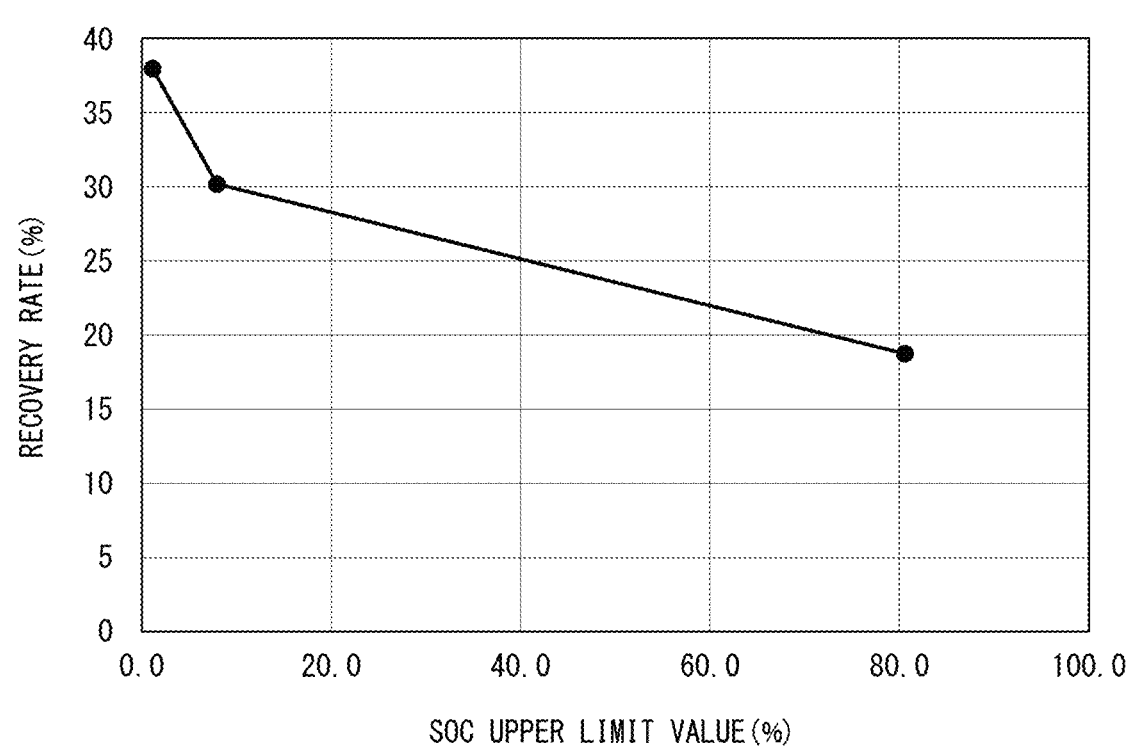
FIG. 10 is a graph showing a test result.

In Table 2 and FIG. 10, for comparison, the result of Example 1-1 is also shown.

TABLE 2

| | Example 1-1 | Example 2-1 | Comparative example 2-1 |
|---|---|---|---|
| Discharge voltage (V) | 2.5 | 3.2 | 3.8 |
| SOC lower limit value (%) | 0 | 6.8 | 79.5 |
| SOC upper limit value (%) | 1.1 | 7.9 | 80.6 |
| Recovery rate (%) | 38.00 | 30.15 | 18.78 |

As shown in Table 2 and FIG. 10, in comparison with Comparative example in which the SOC is high, the recovery rate was increased in the examples in which the SOC is low.

Example 3

A recovery processing test was performed in the same manner as Example 1 except for the current upon charging and discharging. The results are shown in Table 3 and FIG. 11.

Figure 11:
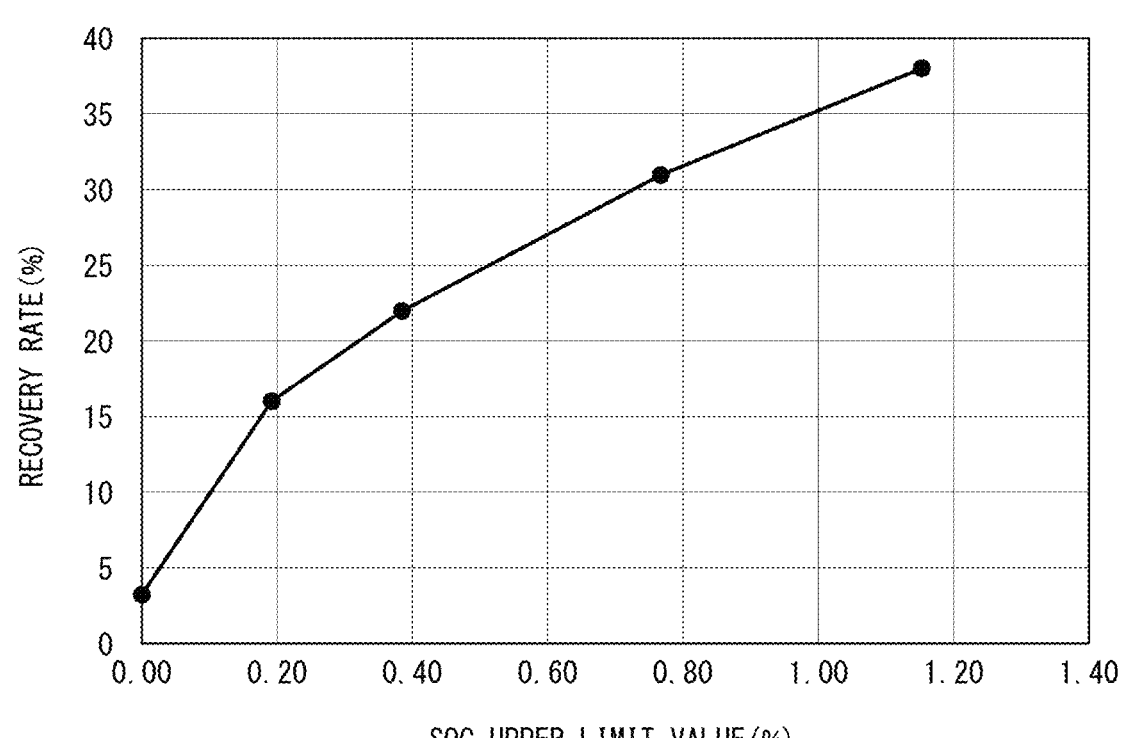
FIG. 11 is a graph showing a test result.

In Table 3 and FIG. 11, for comparison, results of Example 1-1 and Comparative example 1-1 are also shown.

TABLE 3

| | Comparative example 1-1 | Example 3-1 | Example 3-2 | Example 3-3 | Example 1-1 |
|---|---|---|---|---|---|
| Current (A) | — | 1.5 | 3 | 6 | 9 |
| SOC upper limit value (%) | — | 0.19 | 0.38 | 0.77 | 1.1 |
| Recovery rate (%) | 3.23 | 16 | 22 | 31 | 38 |

As shown in Table 3 and FIG. 11, in the examples, a high recovery rate was obtained even when the currents upon the charging and the discharging are different.

Example 4

The recovery processing test was performed in the same manner as Example 1 except for the processing time. The results are shown in Table 3 and FIG. 12.

Figure 12:
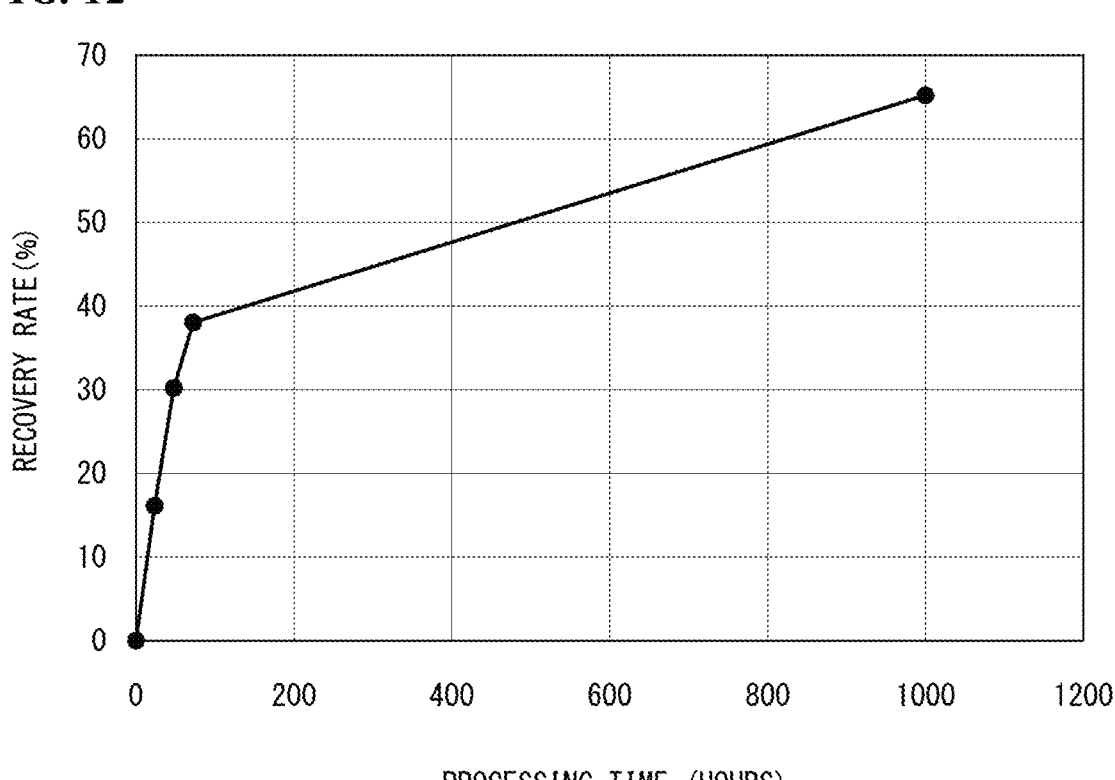
FIG. 12 is a graph showing a test result.

In Table 4 and FIG. 12, for comparison, the results of Example 1-1 and Comparative example 1-1 are also shown.

TABLE 4

| | Comparative example 1-1 | Example 4-1 | Example 4-2 | Example 1-1 | Example 4-3 |
|---|---|---|---|---|---|
| Processing time (h) | — | 24 | 48 | 72 | 1000 |
| Recovery rate (%) | 0 | 16 | 30 | 38 | 65 |

As shown in Table 4 and FIG. 12, a higher recovery rate was obtained as the processing time is lengthened.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

9

10

What is claimed is:

1. A recovery processing method of a lithium ion battery, the method comprising:

repeating a cycle a plurality of times, the cycle including:

a first process of setting an SOC of the lithium ion battery to a first value that is equal to or less than a value of the SOC where a gradient of an SOC-voltage curve is a minimum value through charging; and a second process of setting the SOC of the lithium ion battery to a second value smaller than the first value through discharging.

2. The recovery processing method of the lithium ion battery according to claim 1, wherein the first value is greater than 0%, and the gradient of the SOC-voltage curve is equal to or less than the value of the SOC that is two times the minimum value.

3. The recovery processing method of the lithium ion battery according to claim 1, wherein the first value is 15% or less.

4. The recovery processing method of the lithium ion battery according to claim 1, wherein, prior to the first process and the second process, whether there is a decrease in performance of the lithium ion battery is determined, and the first process and the second process are performed only when the decrease in performance is confirmed.

5. A charge/discharge device electrically connected to a lithium ion battery, the device comprising: a controller configured to perform charging/discharging of the lithium ion battery, wherein the controller repeats a cycle a plurality of times, the cycle including:

a first process of setting an SOC of the lithium ion battery to a first value that is equal to or less than a value of the SOC where a gradient of an SOC-voltage curve is a minimum value through the charging; and a second process of setting the SOC of the lithium ion battery to a second value smaller than the first value through the discharging.

6. A non-transitory computer readable storage medium storing a program configured to cause a charge/discharge device electrically connected to a lithium ion battery to repeat a cycle a plurality of times, the cycle including:

a first process of setting an SOC of the lithium ion battery to a first value that is equal to or less than a value of the SOC where a gradient of an SOC-voltage curve is a minimum value through charging; and a second process of setting the SOC of the lithium ion battery to a second value smaller than the first value through discharging.

* * * * *